United States Patent
Chen et al.

(10) Patent No.: US 6,798,653 B2
(45) Date of Patent: Sep. 28, 2004

(54) DRIVE BRACKET ASSEMBLY

(75) Inventors: Yun-Lung Chen, Tu-chen (TW); Gang Su, Shenzhen (CN); LiXin Ai, Shenzhen (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 37 days.

(21) Appl. No.: 10/339,866

(22) Filed: Jan. 9, 2003

(65) Prior Publication Data

US 2004/0075978 A1 Apr. 22, 2004

(30) Foreign Application Priority Data

Oct. 22, 2002 (TW) ...................................... 91216859 U

(51) Int. Cl.[7] .............................................. G06F 1/16
(52) U.S. Cl. ................ 361/685; 248/220.31; 312/223.1
(58) Field of Search ................................ 361/679–687, 361/724–727, 730–732; 312/223.1–223.6; 369/75.1, 77.1, 77.2; 248/220.31, 224.8, 609–612

(56) References Cited

U.S. PATENT DOCUMENTS 6,590,775 B2 * 7/2003 Chen ........................... 361/725
6,614,654 B2 * 9/2003 Liu et al. ..................... 361/685
6,654,238 B2 * 11/2003 Chen ........................... 361/685

* cited by examiner

Primary Examiner—Hung Van Duong
(74) Attorney, Agent, or Firm—Wei Te Chung

(57) ABSTRACT

A drive bracket assembly (10) includes a bracket (40) adapted for receiving a disk drive (50) therein, a rail (30), and a retaining piece (20). The bracket includes first and second sidewalls (41, 45), and a plurality of slots (42) is defined in the first sidewall. The rail is adapted for being attached to one side of the disk drive. A protrusion (36) protrudes outwardly from the rail. A pair of poles (32) is outwardly formed from the rail, for sliding in a select one of the slots of the first sidewall. The retaining piece is attached to the first sidewall. The retaining piece includes a handle portion (22) and a resilient clip (23) engaging with the protrusion of the rail, thereby securely retaining the disk drive in the bracket. When the handle portion is pressed toward the first sidewall, the clip is rotated outwardly thereby releasing the protrusion.

20 Claims, 6 Drawing Sheets

DRIVE BRACKET ASSEMBLY

BACKGROUND OF THE INVENTION

1. Field of the Invention

The present invention relates to a drive bracket assembly, and more particularly to a drive bracket assembly for readily and securely receiving a disk drive therein.

2. Description of the Related Art

User of computers and technicians alike require that a drive bracket of a computer allows them to easily secure a disk drive such as a hard disk drive (HDD), floppy disk drive (FDD) or CD-ROM drive to the bracket, and to easily remove the disk drive from the bracket. Conventionally, a disk drive is secured to the bracket with screws. However, Insertion and removal of screws is time consuming and cumbersome.

As computers have proliferated and improved, various devices have been developed to facilitate installation and removal of disk drives. One such device comprises two flat rectangular side pieces which are attached to opposite sides of the disk drive. Corresponding receiving rails provided in a drive bracket cooperatively receive the side pieces in sliding engagement. When the disc drive is fully received in the bracket, a screw is tightened so that the screw presses against one of the side pieces or the disk drive itself. However, this device does not altogether eliminate the need for using screws.

SUMMARY OF THE INVENTION

Accordingly, an object of the present invention is to provide a drive bracket assembly which allows a disk drive to be conveniently attached thereto or detached therefrom.

To achieve the above objects, a drive bracket assembly in accordance with a preferred embodiment of the present invention comprises a bracket adapted for receiving a disk drive therein, a rail and a retaining piece. The bracket comprises first and second sidewalls. A plurality of slots is defined in the first sidewall. A plurality of bent plates is bent inwardly from the second sidewall, any of which can support the disk drive thereon. The rail is adapted for being attached to one side of the disk drive. A protrusion protrudes outwardly from the rail. A pair of poles is outwardly formed from the rail, for sliding in a selected one of the slots of the first sidewall of the bracket. The retaining piece is attached to the first sidewall of the bracket. The retaining piece comprises a handle portion and a resilient clip engaging with the protrusion of the rail, thereby securely retaining the disk drive in the bracket. When the handle portion is pressed toward the first sidewall, the clip is rotated outwardly thereby releasing the protrusion.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
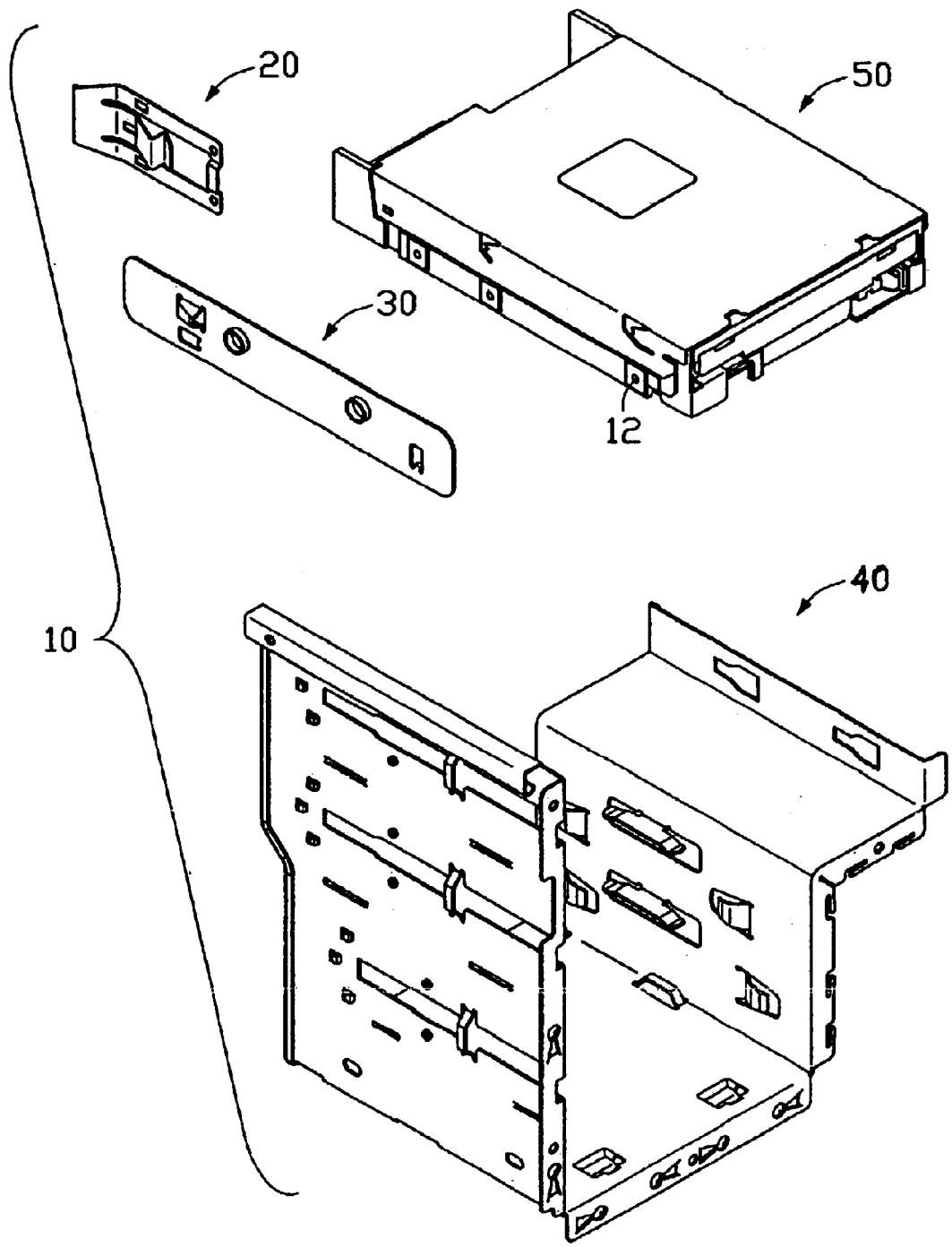
FIG. 1 is an exploded, isometric view of a drive bracket assembly in accordance with a preferred embodiment of the present invention together with a disk drive, the drive bracket assembly comprising a retaining piece, a rail and a bracket.

Referring to FIG. 1, a drive bracket assembly 10 of the present invention comprises a retaining piece 20, a rail 30 and a bracket 40. The bracket 40 is provided for housing, at the very least, a disk drive 50 such as a hard disk drive therein.

Figure 2:
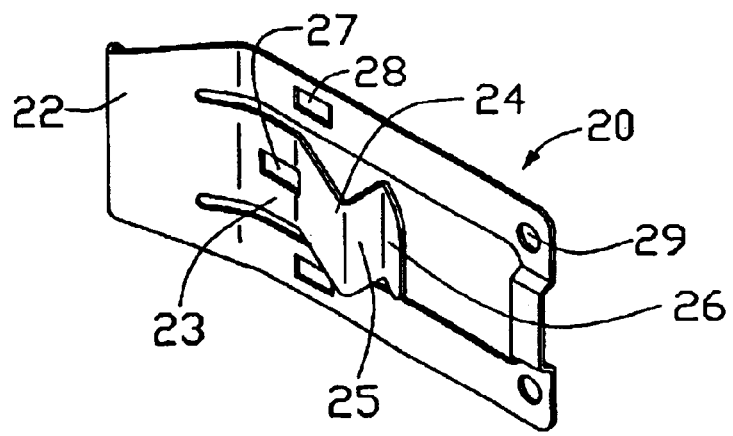
FIG. 2 is an enlarged, isometric view of the retaining piece of FIG. 1.

Referring to FIG. 2, the retaining piece 20 comprises a main portion and a cantilevered handle portion 22 extending obliquely rearwardly from the main portion. A resilient clip 23 is longitudinally punched out from a middle of the retaining piece 20. The clip 23 is bent obliquely outwardly from a rear base portion thereof to form a first slanting portion 24, then bent obliquely inwardly to form a second slanting portion 25, and then bent obliquely outwardly to form a distalmost third slanting portion 26. A space is defined between the first and second slanting portions 24, 25. A first aperture 27 is defined in the rear base portion of the clip 23 adjacent the first slanting portion 24. A pair of second apertures 28 is respectively defined in upper and lower portions of the retaining piece 20 that are at opposite sides of the clip 23 respectively. A pair of vertically spaced holes 29 is defined in a front end of the retaining piece 20.

Figure 3:
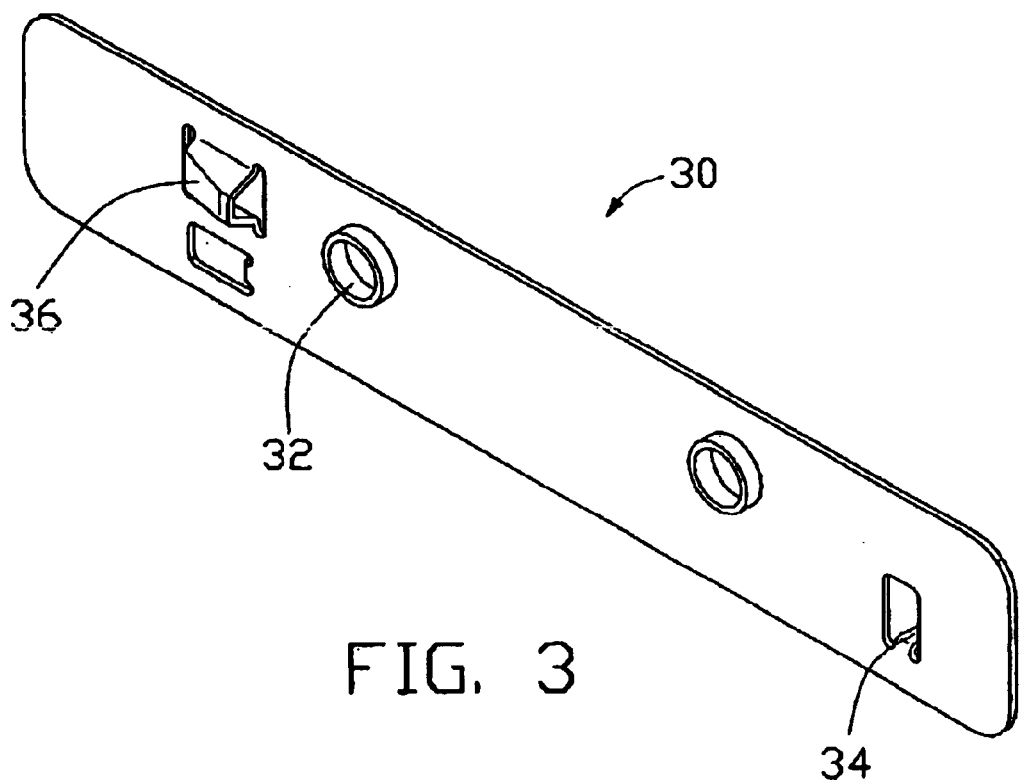
FIG. 3 is an enlarged, isometric view of the rail of FIG. 1.

Referring to FIG. 3, the rail 30 is adapted for being attached to the disk drive 50. A pair of horizontally spaced poles 32 is outwardly formed from an upper portion of the rail 30. A pair of spaced pins 34 is bent inwardly from a lower portion of the rail 30. A wedge-shaped protrusion 36 protrudes outwardly adjacent a rear end of the rail 30. The protrusion 36 is generally in alignment with the poles 32.

Figure 4:
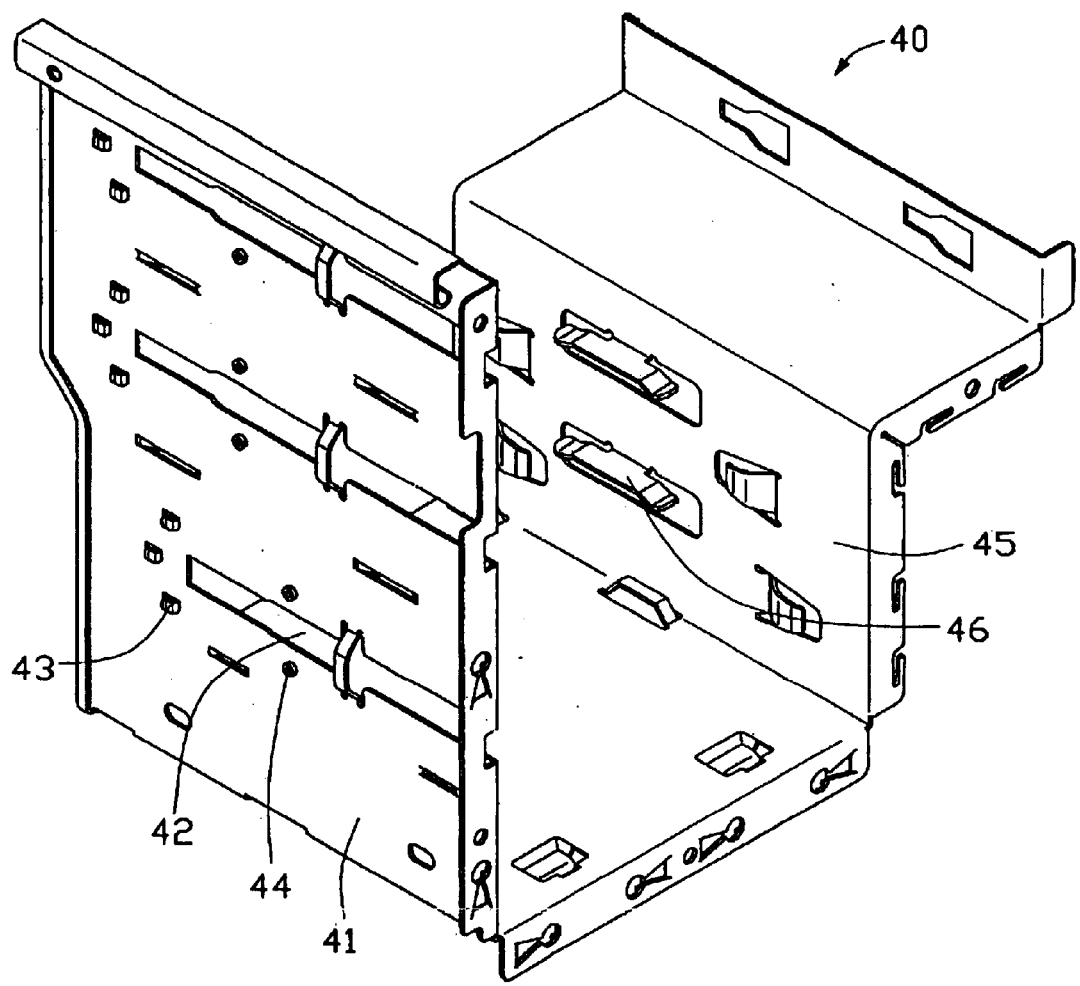
FIG. 4 is an enlarged, isometric view of the bracket of FIG. 1.

Referring to FIG. 4, the bracket 40 comprises opposing first and second sidewalls 41, 45. A plurality of spaced parallel slots 42 is defined in the first sidewall 41, for receiving the poles 32 of the rail 30 therein. Three latches 43 are formed adjacent a rear end of each slot 42, corresponding to the first and second apertures 27, 28 of the retaining piece 20. Each slot 42 comprises a main wide portion slidably receiving the poles 32 of the rail 30, and a rear narrow portion receiving the protrusion 36 of the rail 30. A pair of bosses 44 protrudes outwardly from the first sidewall 41 respectively above and below each slot 42, for being fittingly received in the holes 29 of the retaining piece 20. A plurality of bent plates 46 is bent perpendicularly inwardly from the second sidewall 45. The bent plates 46 correspond to the slots 42 of the first sidewall 41.

Referring to FIG. 1, a plurality of holes 12 is defined in a first side of the disk drive 50, for receiving the pins 34 of the rail 30 respectively.

Figure 5:
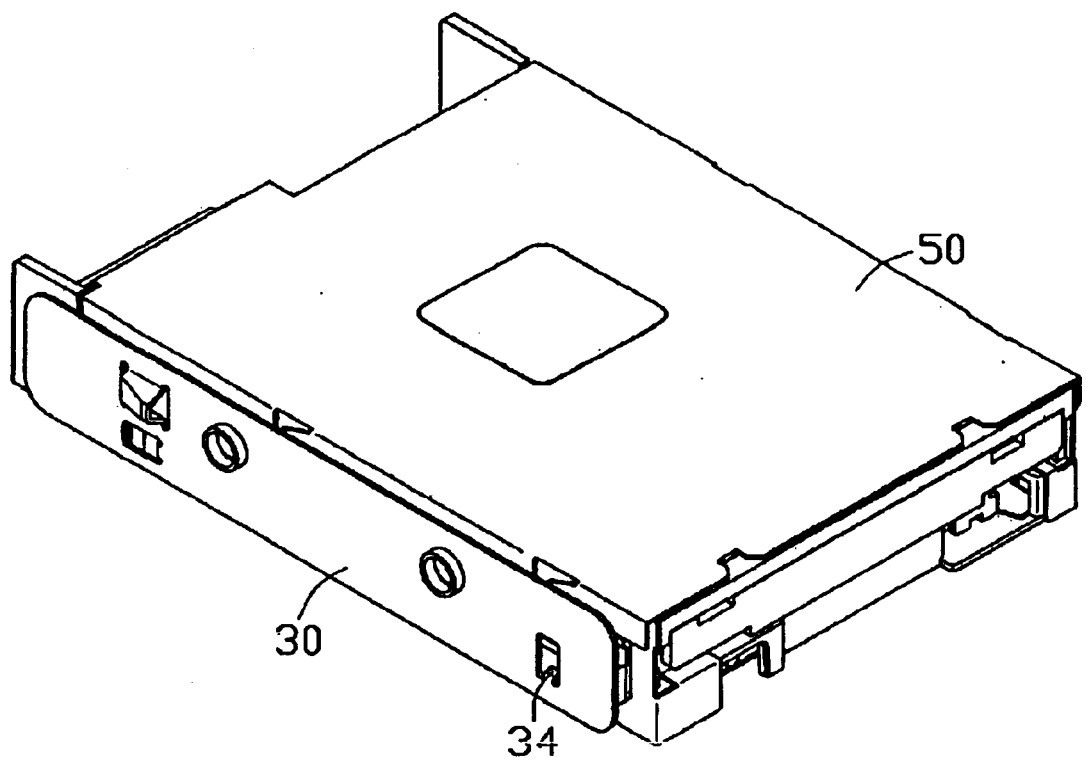
FIG. 5 is an assembled view of the rail and the disk drive of FIG. 1.
Figure 6:
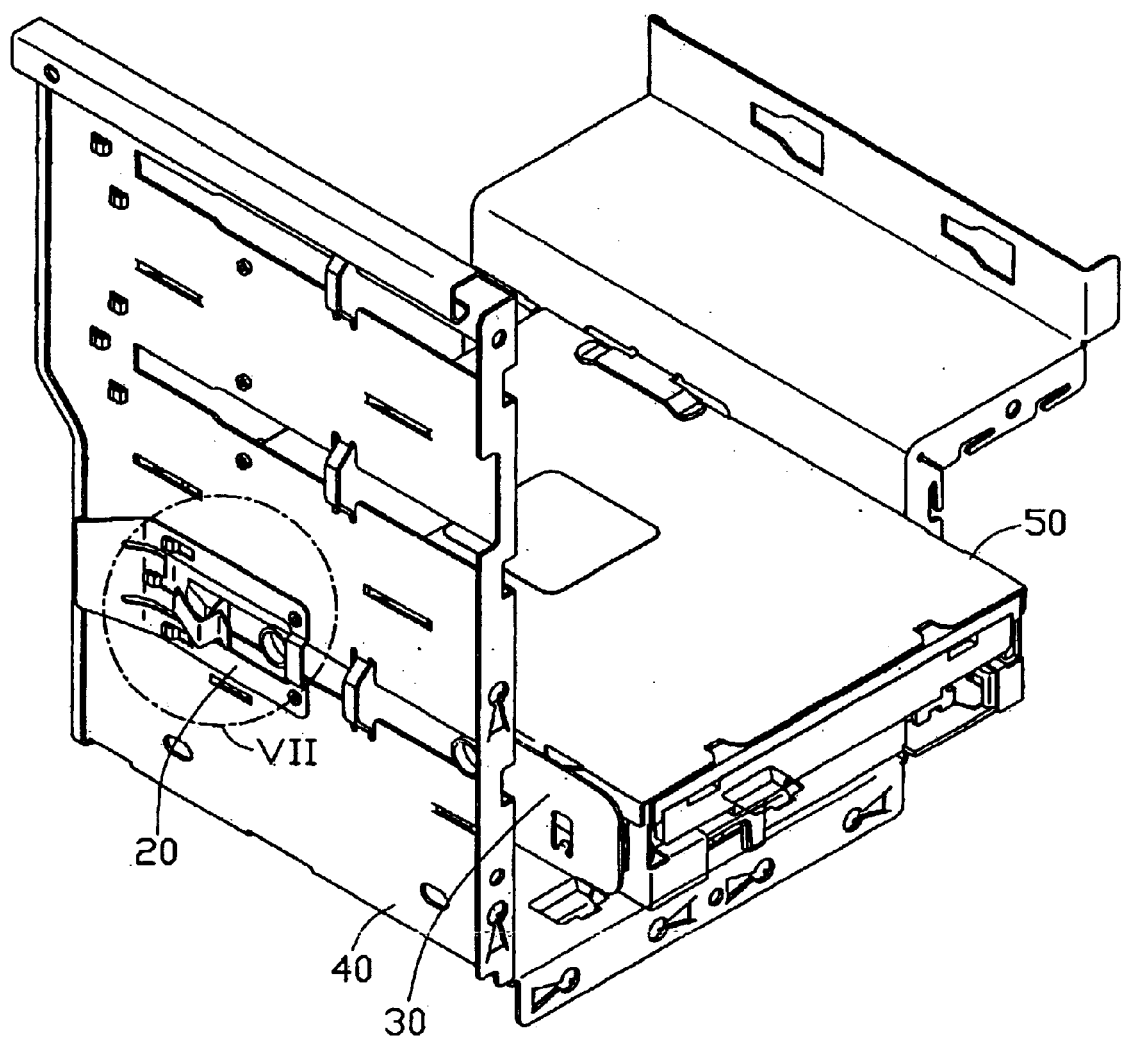
FIG. 6 is an assembled view of FIG. 1.
Figure 7:
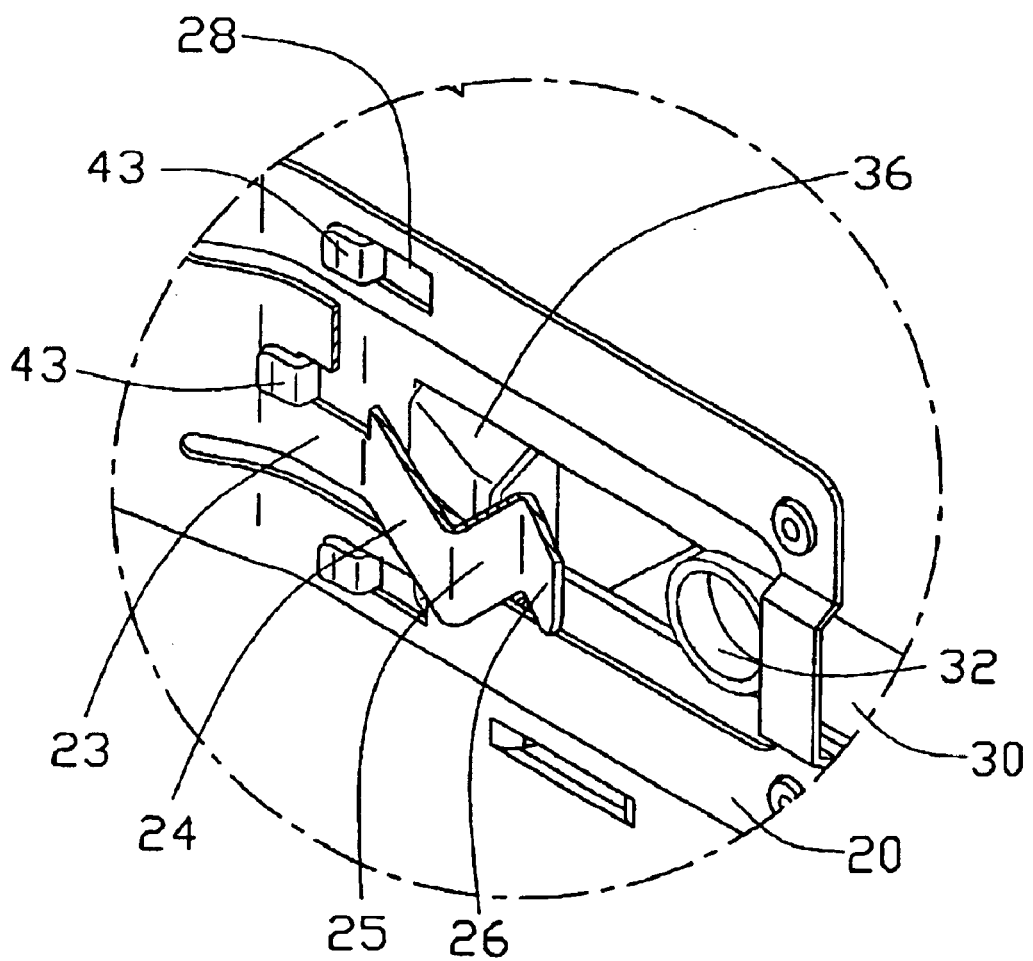
FIG. 7 is an enlarged view of a circled portion VII of FIG. 6.

Referring to FIGS. 5 through 7, in assembly, the retaining piece 20 is fixedly attached to the first sidewall 41 of the bracket 40, with the latches 43 engaging in the first and second apertures 27, 28 respectively. The bosses 44 are fittingly received in the holes 29. A pair of screws (not shown) is extended into the bosses 44 to secure the retaining piece 20 to the first sidewall 41. The handle portion 22 can be pressed toward the first sidewall 41 to pivot the clip 23 outwardly. The rail 30 is attached to the disk drive 50, with the pins 34 of the rail 30 being received in the holes 12 of the disk drive 50. The combined disk drive 50 and rail 30 is then received in the bracket 40. The poles 32 of the rail 30 are received in a selected one of the slots 42. A second side of the disk drive 50 abuts the second sidewall 45, with a bottom of the disk drive 50 being supported on the corresponding bent plate 46. The combined disk drive 50 and rail 30 is pushed rearwardly in the bracket 40, with the poles 32 sliding in the slot 42. The protrusion 36 slides along the rear narrow portion of the slot 42, and rides along over the third slanting portion 26 of the clip 23. When a rear end of the protrusion 36 reaches a rear end of the rear narrow portion of the slot 42, the protrusion 36 passes beyond the third slanting portion 26 and is snappingly received in the space between the first and second slanting portions 24, 25. In this position, a front end of the protrusion 36 abuts the second slanting portion 25, thus preventing the rail 30 from accidentally sliding forwardly. Simultaneously, a rearmost one of the poles 32 engages with the first sidewall 41 at a junction of the front wide portion and the rear narrow portion of the slot 42. The disk drive 50 is thus securely retained in the bracket 40.

In disassembly, the handle portion 22 of the retaining piece 20 is pressed toward the first sidewall 41 of the bracket 40. The clip 23 is thus rotated away from the first sidewall 41. The protrusion 36 is accordingly released from the second slanting portion 25 of the clip 23. The disk drive 50 is then readily withdrawn from the bracket 40.

While the present invention has been illustrated by the above description of an embodiment thereof, and while the embodiment has been described in considerable detail, it is not intended to restrict or in any way limit the scope of the appended claims to such detail. Additional advantages and modifications will readily appear to those skilled in the art. For example, the retaining piece may be integrally formed with the bracket through proper configuration and dimension arrangement thereof, in comparison with the discrete manner in the above embodiment. Therefore, the present invention is not limited to the specific details and illustrative examples shown and described above.

What is claimed is:

1. A drive bracket assembly comprising:
   a bracket adapted for slidably receiving a disk drive therein, the bracket comprising first and second sidewalls, at least one slot being defined in the first sidewall;
   a rail adapted for being attached to the disk drive, a protrusion protruding outwardly from the rail, a plurality of projections projecting from the rail for slidingly engaging in the at least one slot of the bracket; and
   a retaining piece fixedly located on the first sidewall of the bracket and comprising a resilient clip for securely sandwiching the protrusion with the first sidewall and thereby attaching the disk drive to the bracket.

2. The drive bracket assembly as claimed in claim 1, wherein the retaining piece further comprises a handle portion at an end thereof, and wherein when the handle portion is pressed toward the first sidewall the clip is rotated outwardly to release the protrusion.

3. The drive bracket assembly as claimed in claim 1, wherein at least one bent plate is disposed on the second sidewall for supporting a bottom of the disk drive thereon.

4. The drive bracket assembly as claimed in claim 1, wherein a plurality of latches is arranged adjacent a rear end of the at least one slot, and a plurality of apertures is defined in the retaining piece, and the latches engage in the apertures respectively.

5. The drive bracket assembly as claimed in claim 1, wherein the protrusion is generally wedge-shaped.

6. The drive bracket assembly as claimed in claim 2, wherein the clip sequentially comprises a first slanting portion, a second slanting portion and a third slanting portion, and the protrusion rides along the third slanting portion into a space between the first and second slanting portions such that the second slanting portion abuts a front end of the protrusion to prevent the protrusion from sliding forwardly.

7. The drive bracket assembly as claimed in claim 4, wherein a plurality of spaced holes is defined in a front end of the retaining piece, and a plurality of bosses is arranged on the first sidewall above and below the at least one slot for being fittingly received in the holes of the retaining piece respectively.

8. The drive bracket assembly as claimed in claim 5, wherein a plurality of spaced pins is arranged on an inner face of the rail below the projections and the protrusion, for engaging with the disk drive.

9. A disk drive assembly comprising:
   at least one disk drive;
   a rail attached to a first side of the at least one disk drive, the rail comprising a blocking means and a sliding means protruding outwardly from the rail respectively;
   a bracket for receiving the at least one disk drive therein, the bracket comprising first and second sidewalls, at least one supporting piece arranged at the second sidewall for slidably supporting the at least one disk drive thereon, at least one slot being defined in the first sidewall;
   a retaining piece comprising a main portion, a handle portion and a resilient clip, the main portion fixedly attached to the bracket at the at least one slot, the resilient clip extending along the main portion and forming a first slanting portion and a second slanting portion;
   wherein the at least one disk drive is slidably received in the bracket with the sliding means sliding in the at least one slot to cause the blocking means to be retained between the first sidewall at a rear end of the at least one slot and the second slanting portion of the retaining piece.

10. The drive bracket assembly as claimed in claim 9, wherein when the handle portion is pressed toward the first sidewall, the clip is moved away from the first sidewall thereby disengaging the second slanting portion from the blocking means.

11. The drive bracket assembly as claimed in claim 9, wherein the sliding means comprises at least one projection projecting outwardly from the rail in general alignment with the blocking means.

12. The drive bracket assembly as claimed in claim 9, wherein a plurality of latches is arranged on the first sidewall adjacent the rear end of the at least one slot, and a plurality of apertures is defined in the rail respectively receiving the latches therein.

13. The drive bracket assembly as claimed in claim 9, wherein the at least one supporting piece comprises at least one bent plate bent inwardly from the second sidewall of the bracket.

14. The drive bracket assembly as claimed in claim 11, wherein the at least one projection comprises a pair of horizontally spaced poles projecting from an upper portion of the rail, and the blocking means comprises a wedge-shaped protrusion.

15. The drive bracket assembly as claimed in claim 12, wherein a plurality of spaced holes is defined in a front end of the retaining piece, a plurality of bosses is arranged on the first sidewall above and below the at least one slot, the bosses being fittingly received in the holes.

16. The drive bracket assembly as claimed in claim 14, wherein a plurality of pins extends inwardly from a lower portion of the rail, the pins engaging in the first side of the at least one disk drive.

17. A drive bracket assembly comprising:

a disk drive;

a rail attached to a side face of the disk drive;

a outwardly projecting blocking device formed on the rail;

a bracket including two side walls defining a slot therein along a front-to-back direction, the disk drive assembled to the bracket along said front-to-back direction with the blocking device moving along said slot and exposed to an exterior through said slot; and a retaining piece including a main portion located on the an exterior face of the bracket opposite to said disk drive, and a resilient clip extending from the main portion with thereof an abutment face releasably engaged with the blocking device around said slot.

18. The assembly as claimed in claim 17, wherein said retaining piece further includes a handle portion actuating said abutment face to move for disengagement between the abutment face and the block device so as to allow the disk drive to backwardly move along said front-to-back direction.

19. The assembly as claimed in claim 17, wherein said retaining piece is discrete from said bracket.

20. The assembly as claimed in claim 18, wherein said handle portion is integrally formed on said clip.

* * * * *